(12) United States Patent
Foes

(10) Patent No.: US 8,733,776 B1
(45) Date of Patent: May 27, 2014

(54) BUMPER PROTECTION OF STEERING STRUCTURE

(76) Inventor: Brent Foes, Pasadena, CA (US)

( * ) Notice: Subject to any disclaimer, the term of this patent is extended or adjusted under 35 U.S.C. 154(b) by 95 days.

(21) Appl. No.: 13/506,665

(22) Filed: May 7, 2012

(51) Int. Cl.
B62J 27/00 (2006.01)
(52) U.S. Cl.
USPC .......................................... 280/304.3; 280/272
(58) Field of Classification Search
USPC .................................... 280/288.4, 304.3, 272
See application file for complete search history.

(56) References Cited

U.S. PATENT DOCUMENTS

| 1,412,241 | A  | * | 4/1922 | Hall | 248/345.1 |
| 6,340,142 | B1 | * | 1/2002 | Li | 248/74.1 |
| 8,522,983 | B2 | * | 9/2013 | Davis | 209/672 |
| 2007/0039409 | A1 | * | 2/2007 | Meng | 74/551.8 |

* cited by examiner

Primary Examiner — Kevin Hurley
(74) Attorney, Agent, or Firm — William W. Haelfiger

(57) ABSTRACT

A bumper assembly for use on a cycle steering column, comprising in combination a C-shaped gripper sleeve, an elastomeric bumper attached to the sleeve, and having a bumper surface presented outwardly relative to the sleeve, there being adjustable retainer means configured to releasably hold the bumper and sleeve in selected positions, whereby the sleeve is adjustable endwise and rotatably to adjustably position and retain the sleeve to the steering column, with the bumper presented outwardly, in a selected direction, as aforesaid.

8 Claims, 3 Drawing Sheets

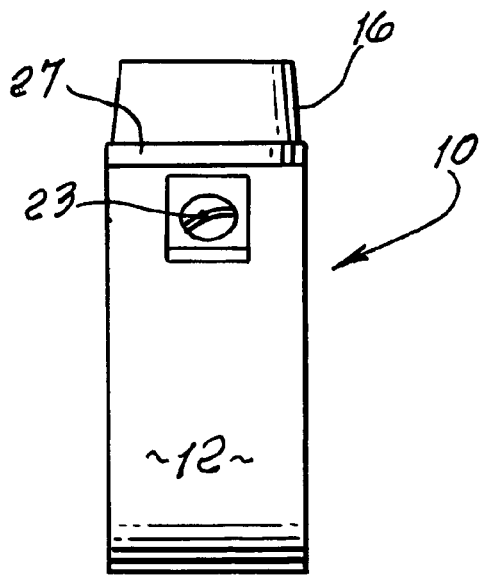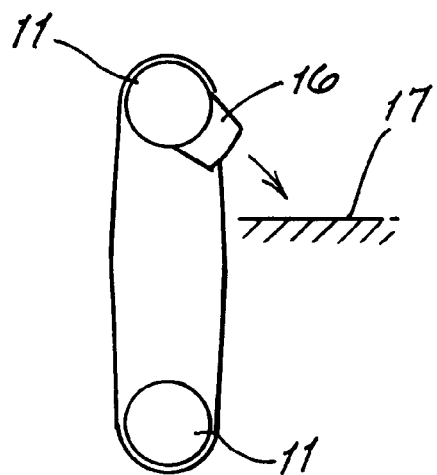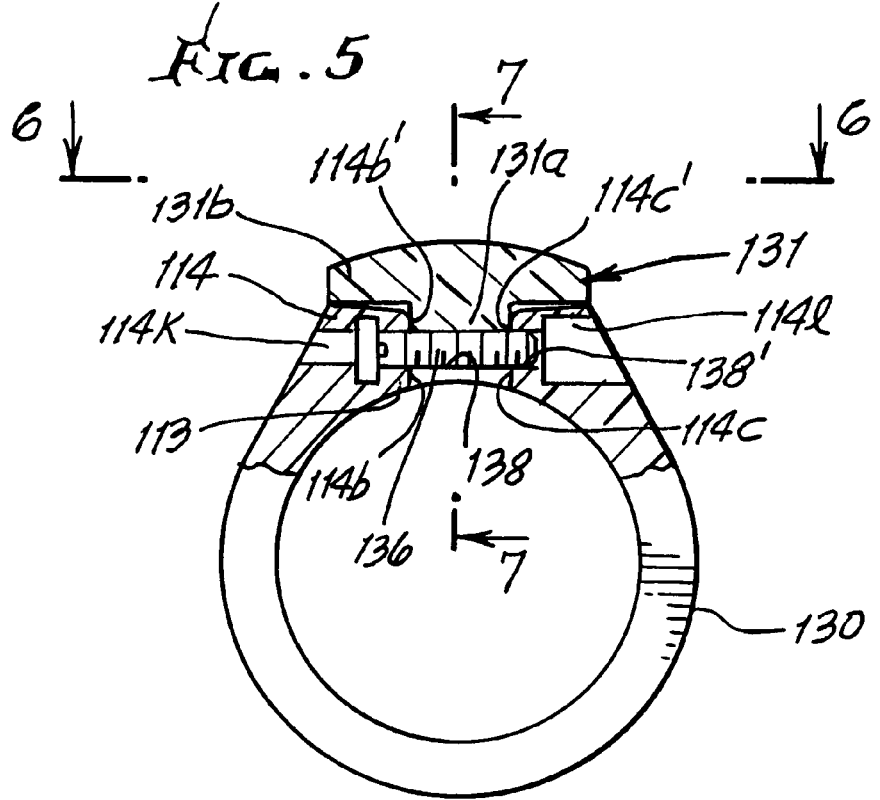

US 8,733,776 B1

BUMPER PROTECTION OF STEERING STRUCTURE

BACKGROUND OF THE INVENTION

This invention relates generally to adjustably limiting the rotation of motorcycle or bicycle steering columns, and more particularly to a bumper device that is easily applied to a steering column, or the like and is easily adjustable, for such use.

There is need for improvements in bumper devices as referred to, and which can be easily applied and adjusted, without adhesively self attaching to steering columns, over long time periods. Also, there is need for devices as shown and described herein.

SUMMARY OF THE INVENTION

It is a major object of the invention to provide an improved position limiting bumper device having advantages in construction, functioning, and improved results, as will be seen. Basically, the device comprises:

a) a C-shaped gripper sleeve,
b) an elastomeric bumper attached to the sleeve, and having a bumper surface presented outwardly relative to the sleeve,
c) there being adjustable retainer means configured to releasably hold the bumper and sleeve in selected positions, whereby the sleeve is adjustable endwise and rotatably to adjustably position and retain the sleeve to the steering column, with the bumper presented outwardly, in a selected direction, as aforesaid.

It is another object to provide the retainer means in the form of a screw threaded holder that will releasably hold the sleeve to a cycle steering column, without adhesively self attaching to the column.

It is a further object to provide a retainer projecting through a sleeve wall, to tighten together sleeve wall portions projecting at the side of the steering column, the bumper projecting at an outer side of said wall.

A further object includes provision of a screw threaded fastener located within an enlarged section of the sleeve. As will be seen, the sleeve enlarged section typically has a flat outer surface seating the elastomeric bumper.

Yet another object includes provision by the enlarged sleeve section of a flat outer surface seating the bumper, held in position by the threaded means.

An added object is to provide the bumper with a T-shaped cross section, with a concealed stem penetrated by the screw threaded fastener, for position retention. As will be seen, the stem of the T-shape may be retained between outwardly convergent sleeve walls, for positive and enhanced retention by the sleeve.

These and other objects and advantages of the invention, as well as the details of an illustrative embodiment, will be more fully understood from the following specification and drawings, in which:

DRAWING DESCRIPTION

Figure 1:
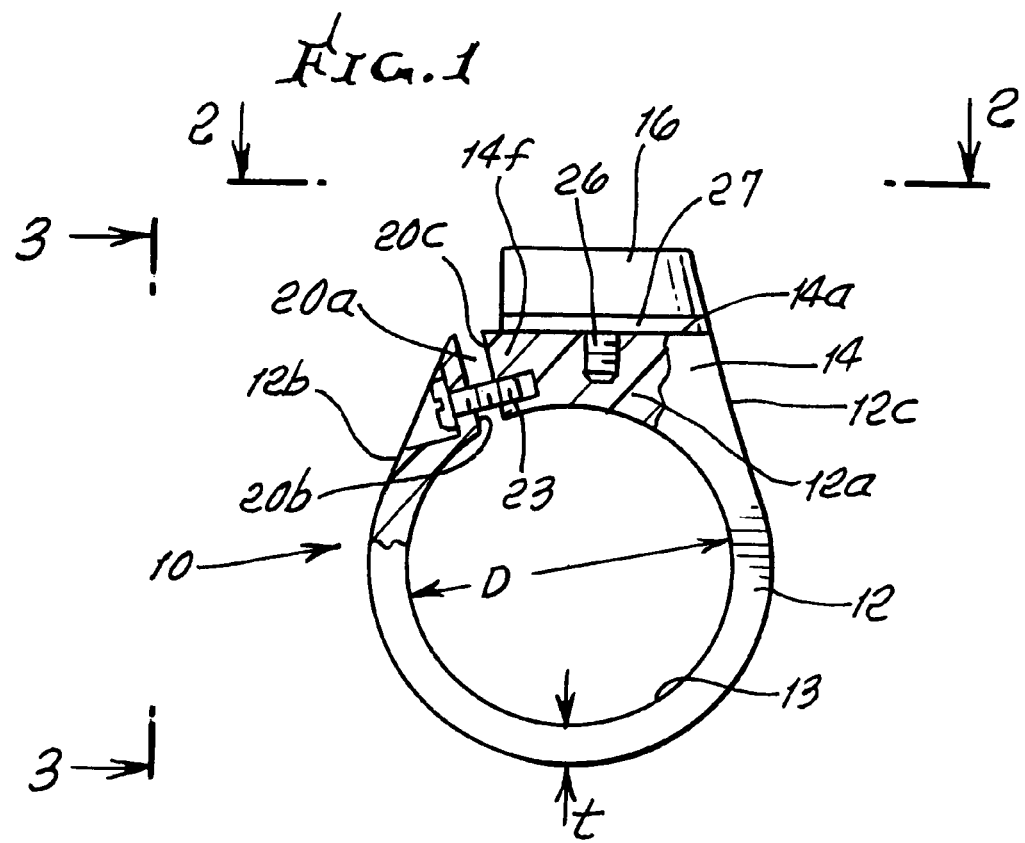
Figure 2:
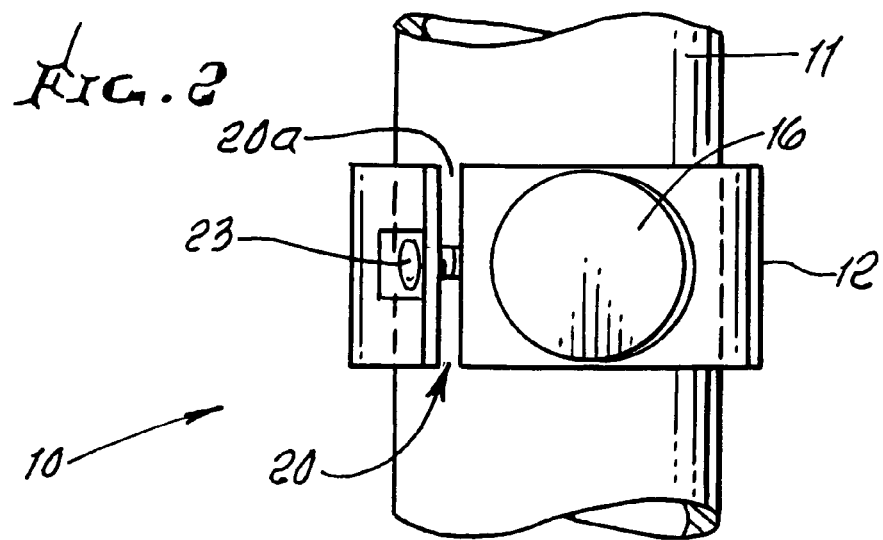
Figure 6:
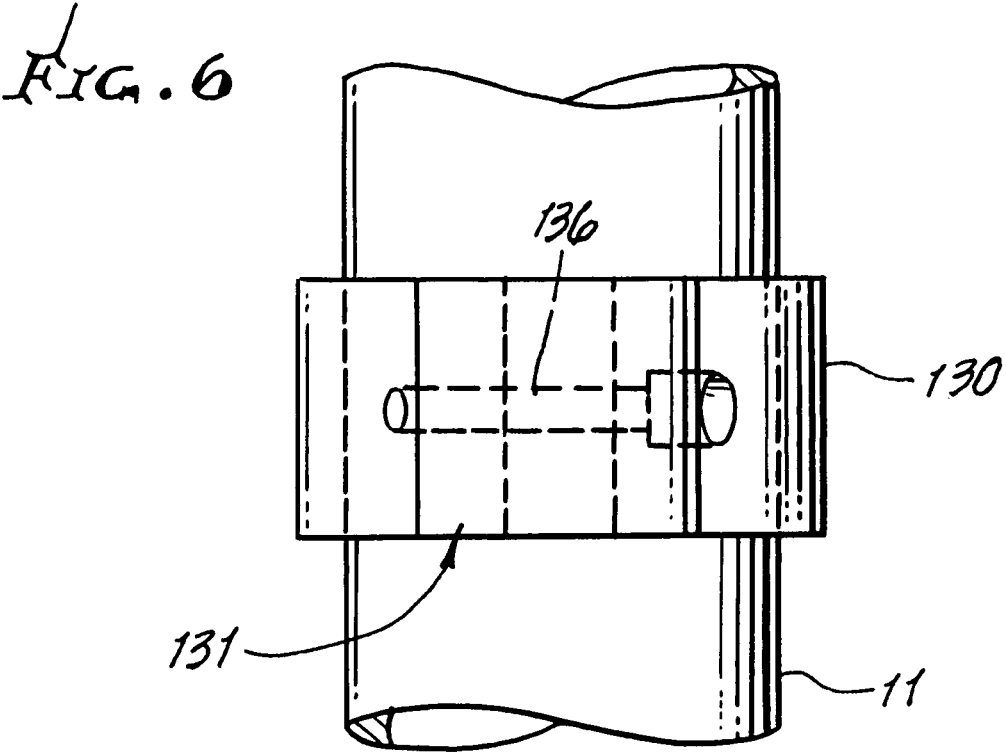
Figure 7:
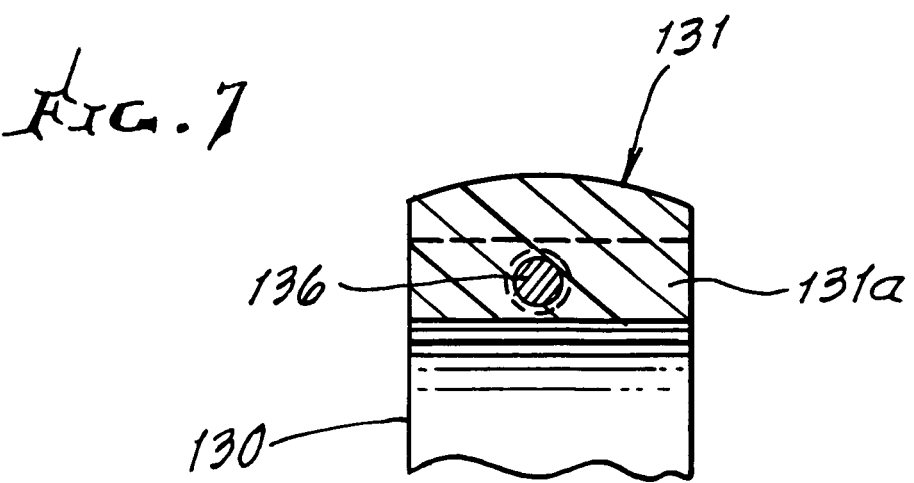

FIG. 1 is an end view, in section, of a preferred bumper assembly incorporating the assembly;
FIG. 2 is a top plan view taken on lines 2-2 of FIG. 1;
FIG. 3 is a side elevation taken on lines 3-3 of FIG. 1;
FIG. 4 is a fragmentary view showing use of the FIGS. 1-3 device on a cycle frame;
FIG. 5 is an end view, in section, showing another form of a device incorporating the invention;
FIG. 6 is a top plan view taken on lines 6-6 of FIG. 5; and
FIG. 7 is a section taken on lines 7-7 of FIG. 5.

DETAILED DESCRIPTION

Referring first to FIGS. 1-3, bumper assembly 10 is configured for use on a cycle (bicycle or motorcycle, etc.) tubular steering column 11, and to fit easily to the column, as well as to be readily loosened for rotary or lengthwise adjustment on the column. The assembly includes a generally C-shaped gripper sleeve 12 having a circular inner surface 13. At its upper side, the sleeve defines a thickened head 14 forming a substantially flat plateau surface 14a. The sleeve preferably consists of a molded plastic (synthetic resin) body 12a located between side surfaces 12b and 12c tapering toward plateau surface 14a, whereby the sleeve thickness increases adjacent the side surfaces 12b and 12c, to be substantially greater than sleeve thickness t extending in excess of half the sleeve arcuate extent below 14a, 12b and 12c. The diameter of inner surface 13 is indicated at D. Preferred dimensional values are:

$t \cong 0.150$ mm
$D \cong 35$ mm

As a result, the head 14 below 14a, supporting elastomeric bumper 16, is substantially thicker than t, to provide maximum or near maximum strength for resisting impact forces on the bumper 16, as for example are created when the steering column is turned and bumper 16 strikes cycle structure 17, seen in FIG. 4.

Also provided is adjustable retainer means configured to releasably hold the bumper and sleeve in selected positions, whereby the sleeve is adjustable endwise and rotatably to adjustably position and retain the sleeve to the steering column, with the bumper presented outwardly, in a selected adjusted direction, as aforesaid.

The apparatus is preferably such as to enable quick and reliable releasing of the sleeve from tight fitting position about the steering column, whereby the sleeve may then be adjustably rotated, and/or slipped lengthwise on column 11, for precise location to bump against structure 17.

Note in this regard, that a split 20 is provided at the thickened side portion 14f of the head 14, whereby a gap 20a is formed between split surfaces 20b and 20c. The provided retainer means 23 comprises a screw threaded holder projecting into the head, and through surfaces 20b and 20c, and into sleeve thickened head portions, whereby when holder 23 is tightened, surfaces 20b and 20c are drawn toward each other, for tightening the sleeve grip on the steering column. Conversely, as the holder is loosened, the sleeve is loosened relative to the column, allowing sleeve adjustment. Typically, the sleeve consisting of metal or plastic material does not bond to the steering column. Split 20 is wide enough to accommodate reception of the sleeve over different diameter columns.

The bumper may be rigidly attached to the head 14, as by a screw threaded projection 26 integral with a thin metallic plate 27, to which the bumper is attached as by bonding.

A modification of the preferred device of FIGS. 1-3, is shown in FIGS. 5-7. Corresponding elements are indicated by the same numbers and letters. The head 114 is medially split, to form side surfaces 114b and 114c that taper outwardly from inner cylindrical surface 113 to intersect the plateau surface 114a. The width of the split between 114b and 114c is approximately the same as the width of the thick like shaped head portions 114k and 114l. The head surfaces 114b' and 114c' are upwardly tapering outwardly of the sleeve surface 113 extending in excess of 180° of the sleeve circular extent 130.

Elastomeric bumper 131 has a T-shaped cross section, with thickened stem 131a fitting in the split, as shown, to retain the cross-piece shaped head 131b of the bumper overlying and seated on the top surface plateau extents 114a' and 114a" of the thickened rigid head portions 114k and 114l. The bumper is laterally slidably received in position, and is easily replaceable. A threaded retention fastener 136 is transversely received through an opening 137 in sleeve head portion 114k, through opening 138 in bumper stem 131a, and into threaded opening 138' in sleeve head portion 114l. Accordingly, the bumper is replaceable, and when in position is retained by fastener 136 and by the taper of walls 114b and 114c. The sleeve may consist of metal or molded plastic material.

I claim:

1. A bumper assembly for use on a cycle steering column, comprising in combination:
   a) a C-shaped gripper sleeve,
   b) an elastomeric bumper attached to the sleeve, and having a bumper surface presented outwardly relative to the sleeve,
   c) there being adjustable retainer means configured to releasably hold the bumper and sleeve in selected positions, whereby the sleeve is adjustable endwise and rotatable to adjustably position and retain the sleeve to the steering column, with the bumper presented outwardly, in a selected direction, as aforesaid,
   d) the bumper bonded to a plate having a threaded projection which is screwed into a thickened head of the gripper sleeve.

2. The combination of claim 1 including two enlargements integral with the sleeve, and through which the retainer means projects.

3. The combination of claim 2 wherein said screw threaded means is substantially everywhere located in an enlarged section of the sleeve.

4. The combination of claim 1 wherein the sleeve has an enlarged side portion forming an endwise open cross section to slidably receive a bumper stem portion.

5. The combination of claim 1 including two enlargements integral with the sleeve, and through which the retainer means projects.

6. A bumper assembly for use on a cycle steering column, comprising in combination:
   a) a C-shaped gripper sleeve,
   b) an elastomeric bumper attached to the sleeve, and having a bumper surface presented outwardly relative to the sleeve,
   c) there being adjustable retainer means configured to releasably hold the bumper and sleeve in selected positions, whereby the sleeve is adjustable endwise and rotatable to adjustably position and retain the sleeve to the steering column, with the bumper presented outwardly, in a selected direction, as aforesaid,
   d) and wherein the retainer means projects through a wall defined by the sleeve, and including screw, threaded means projecting into the sleeve,
   e) the bumper being elastomeric and projecting at an outer side of said wall,
   f) and wherein said screw threaded means is substantially everywhere located in an enlarged section of the sleeve,
   g) and wherein the sleeve enlarged section has a flat outer surface seating the bumper, held in position by the threaded means,
   h) and wherein the bumper has a T-shaped cross section, with a concealed stem penetrated by the screw threaded means, for positive retention.

7. The combination of claim 6 wherein the stem of the T-shaped bumper cross section is retained between outwardly convergent sleeve walls, for positive retention.

8. The combination of claim 7 wherein the sleeve has an enlarged side portion forming an endwise open cross section to slidably receive a bumper stem portion.

* * * * *